United States Patent
Lee et al.

(10) Patent No.: US 11,627,163 B2
(45) Date of Patent: Apr. 11, 2023

(54) ELECTRONIC DEVICE FOR CONTROLLING FUNCTION EXECUTION USING DECENTRALIZED NETWORK AND OPERATION METHOD THEREOF

(71) Applicant: Samsung Electronics Co., Ltd., Suwon-si (KR)

(72) Inventors: Youna Lee, Suwon-si (KR); Taejun Kim, Suwon-si (KR); Sungjin Park, Suwon-si (KR); Doyeong An, Suwon-si (KR); Dasom Lee, Suwon-si (KR); Dohyun Jo, Suwon-si (KR); Jinsu Jo, Suwon-si (KR); Kyungmin Chune, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 17/080,008

(22) Filed: Oct. 26, 2020

(65) Prior Publication Data
US 2021/0126950 A1    Apr. 29, 2021

(30) Foreign Application Priority Data
Oct. 25, 2019   (KR) ........................ 10-2019-0133743

(51) Int. Cl.
*H04L 29/06*    (2006.01)
*H04L 9/40*    (2022.01)
*G06F 9/451*    (2018.01)

(52) U.S. Cl.
CPC .............. *H04L 63/20* (2013.01); *G06F 9/451* (2018.02); *H04L 63/10* (2013.01)

(58) Field of Classification Search
CPC ......... H04L 63/20; H04L 63/10; H04L 63/08; H04L 63/0884; H04L 63/108; H04W 12/08
(Continued)

(56) References Cited

U.S. PATENT DOCUMENTS 7,743,149 B1 *   6/2010   O'Doherty .......... H04L 65/1006
                                                                    709/200
11,146,560 B1    10/2021   Nene
(Continued)

FOREIGN PATENT DOCUMENTS

KR          10-1849912 B1    4/2018

OTHER PUBLICATIONS

International Search Report with Written Opinion dated Feb. 15, 2021; International Appln. No PCT/KR2020/014483.
(Continued)

*Primary Examiner* — Longbit Chai
(74) *Attorney, Agent, or Firm* — Jefferson IP Law, LLP

(57) ABSTRACT

An electronic device is provided. The electronic device includes a communication module, a memory storing instructions, and at least one processor operably connected to the communication module and the memory, wherein the at least one processor is, by executing the instructions, configured to receive a request for execution of an application programming interface (API) from an application while driving the application, identify a policy for the execution-requested API based on data received from a decentralized network through the communication module, and determine whether to execute the execution-requested API, based on the identified policy for the API.

12 Claims, 11 Drawing Sheets

(58) Field of Classification Search
USPC .............................................................. 726/1
See application file for complete search history.

(56) References Cited

U.S. PATENT DOCUMENTS

| | | | |
|---|---|---|---|
| 2009/0313666 A1* | 12/2009 | Pruter | ................ H04N 21/2541 |
| | | | 725/86 |
| 2017/0373945 A1 | 12/2017 | Chrysanthakopoulos et al. | |
| 2018/0239897 A1 | 8/2018 | Ventura | |
| 2018/0352033 A1 | 12/2018 | Pacella et al. | |
| 2019/0020665 A1* | 1/2019 | Surcouf | ............. H04L 63/1408 |
| 2019/0156026 A1 | 5/2019 | Liao et al. | |
| 2019/0197534 A1 | 6/2019 | Alastair | |

OTHER PUBLICATIONS

Contract ABI Specifcation; https://solidity.readthedocs.io/en/develop/abi-spec.html#function-selector.

* cited by examiner

ELECTRONIC DEVICE FOR CONTROLLING FUNCTION EXECUTION USING DECENTRALIZED NETWORK AND OPERATION METHOD THEREOF

CROSS-REFERENCE TO RELATED APPLICATION(S)

This application is based on and claims priority under 35 U.S.C. § 119(a) of a Korean patent application number 10-2019-0133743, filed on Oct. 25, 2019, in the Korean Intellectual Property Office, the disclosure of which is incorporated by reference herein in its entirety.

BACKGROUND

1. Field

The disclosure relates to an electronic device. More particularly, the disclosure relates to an electronic device for controlling function execution using a decentralized network and an operation method thereof.

2. Description of Related Art

A decentralized network is a network distinguished from a centralized network, in which decision-making is performed by a central server. The decentralized network may be a network in which decision-making is performed according to a consensus algorithm of nodes participating in the decentralized network.

A distributed ledger may refer to ledgers that record transaction details and are distributed and stored in multiple nodes.

A distributed ledger existing in the decentralized network may be stored in each node participating in the decentralized network. Such a distributed ledger existing in the decentralized network can be updated according to a consensus algorithm of nodes participating in the decentralized network.

Therefore, a decentralized network having a distributed ledger has an advantage of not requiring a centralized server. Accordingly, various solutions using a decentralized network having a distributed ledger are increasingly demanded.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a centralized server to control various functions performed by an electronic device in real time. In order to expand the control capability of the centralized server, the centralized server is required to have an enhanced capability. Therefore, a solution for minimizing the cost of constructing the centralized server is required.

The technical subjects pursued in the disclosure may not be limited to the above-mentioned technical subjects, and other technical subjects which are not mentioned may be clearly understood, through the following descriptions, by those skilled in the art to which the disclosure pertains.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a memory for storing instructions, and at least one processor operably connected to the communication module and the memory, wherein the at least one processor is, by executing the instructions, configured to receive a request for execution of an application programming interface (API) from an application while driving the application, identify a policy for the execution-requested API based on data received from a decentralized network through the communication module, and determine whether to execute the execution-requested API, based on the identified policy for the API.

In accordance with another aspect of the disclosure, a method for operating an electronic device is provided. The method includes receiving a request for execution of an application programming interface (API) from an application while driving the application, identifying a policy for the execution-requested API based on data received from a decentralized network using a communication module of the electronic device, and determining whether to execute the execution-requested API, based on the identified policy for the API.

In accordance with another aspect of the disclosure, an electronic device and a method for operating the same according to an embodiment are provided to control various functions performed in the electronic device in real time using a decentralized network having a distributed ledger in which a function control policy is recorded, and thus may not need server construction.

In accordance with another aspect of the disclosure, effects obtainable may not be limited to the above-mentioned effects, and other effects which are not mentioned may be clearly understood, through the following descriptions, by those skilled in the art to which the disclosure pertains.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a", "an", and "the" include plural referents unless the context clearly dictates otherwise. Thus, for example, reference to "a component surface" includes reference to one or more of such surfaces.

Figure 1:
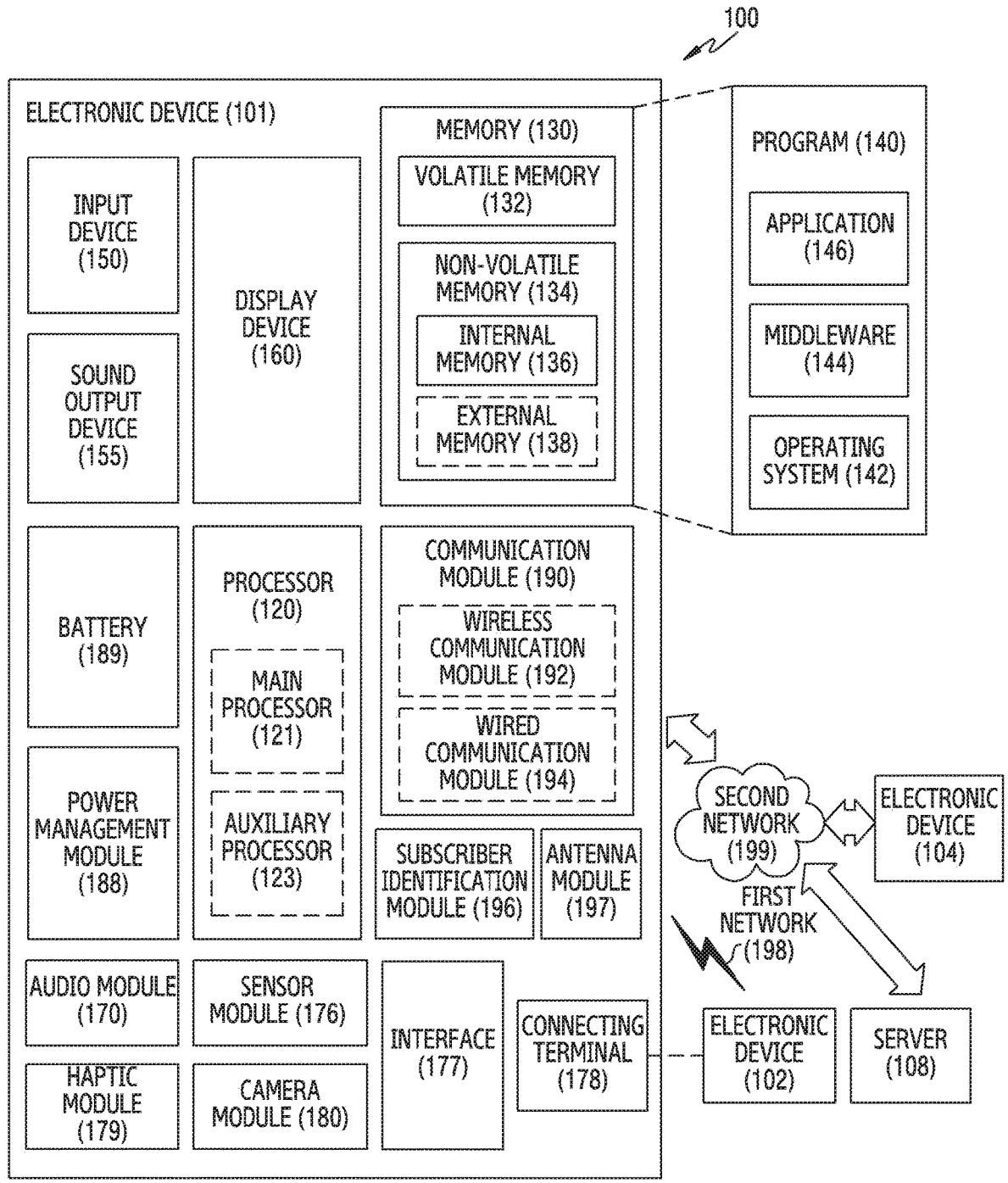
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, and/or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, a fuel cell, or combinations thereof.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi-components (e.g., multi-chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 is instructed to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
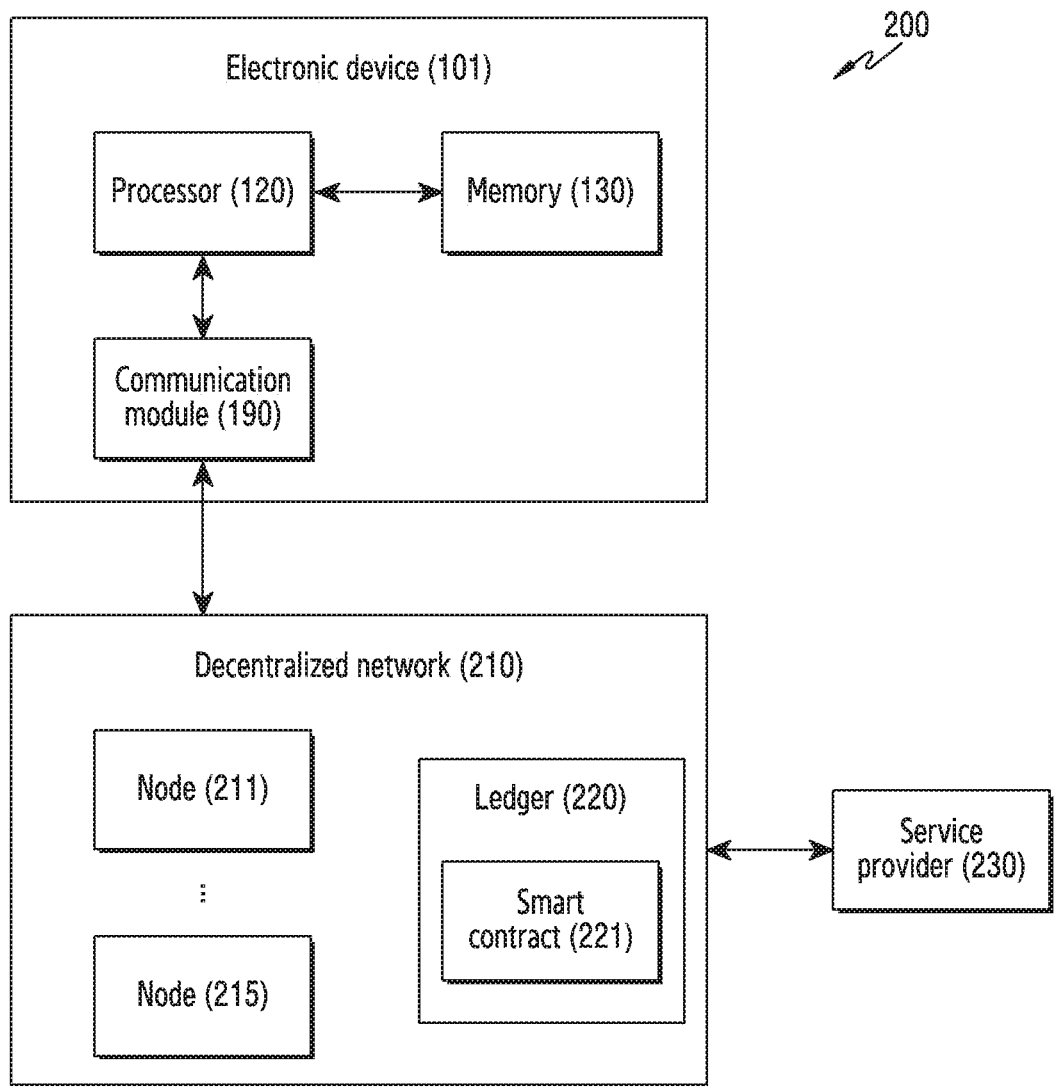
FIG. 2 is a block diagram of an electronic device in a network environment according to an embodiment of the disclosure.

FIG. 2 is a block diagram of an electronic device in a network environment according to an embodiment of the disclosure.

Referring to FIG. 2, the electronic device and environment 200 may correspond to the electronic device 101 and environment 100 of FIG. 1. In one embodiment, each of nodes 211 and 215 configuring a decentralized network 210 of FIG. 2 may correspond to the electronic device 104 of FIG. 1. In one embodiment, a service provider 230 of FIG. 2 may correspond to the server 108 of FIG. 1.

In one embodiment, the decentralized network 210 may include the nodes 211 and 215 and a ledger 220. In one embodiment, the decentralized network 210 may be a network in which the nodes 211 and 215 are connected in a peer-to-peer (P2P) fashion. In one embodiment, the decentralized network 210 may be a network in which each of the nodes 211 and 215 stores the ledger 220. In one embodiment, the decentralized network 210 may include a blockchain network (e.g., a Bitcoin network or an Ethereum network).

In one embodiment, at least a part of the ledger 220 may be stored in each of the nodes 211 and 215. In one embodiment, the ledger 220 may be chain-type data in which a block including transactions refers to a previous block including other transactions. In one embodiment, a transaction may be data indicating transaction details between accounts. In one embodiment, the transaction may be data indicating a smart contract (e.g., a smart contract 221).

In one embodiment, the nodes 211 and 215 may generate a block including transactions through a consensus algorithm (e.g., proof of work (PoW) and proof of stake (PoS)). In one embodiment, transactions may be data generated by an external device (e.g., the electronic device 101, the service provider 230), the nodes 211 and 215, or a combination thereof.

In one embodiment, the nodes 211 and 215 may transmit data included in the ledger 220 to the outside based on a request from an external device (e.g., the electronic device 101 or the service provider 230). In one embodiment, the nodes 211 and 215 may execute the smart contract 221 based on a request from the external device (e.g., the electronic device 101 or the service provider 230), and may transmit data indicating the result of execution of the smart contract 221 to the outside.

In one embodiment, the service provider 230 may be a device used by a manager who has an address at which the smart contract 221 is deployed in the decentralized network 210. In one embodiment, the service provider 230 may be a device used by another manager having an address designated as the manager of the smart contract 221.

In one embodiment, the smart contract 221 may include a function control policy. In one embodiment, the function control policy may be data indicating whether to make an allowance (or approve a validity) for an application programming interface (API) called by the electronic device 101, a parameter (for example, an address) inserted into the API, or a combination thereof. In one embodiment, the function control policy may be data indicating whether to make an allowance for at least one API that can be called by an application (e.g., the application 146 of FIG. 1) of the electronic device 101. In one embodiment, the function control policy may be data indicating whether to make allowance (or approve a validity) for a parameter value inserted into the API. For example, when the parameter inserted into the API is an address, the function control policy may indicate whether to make an allowance (or approve a validity) for the address. In one embodiment, the address may include a user's address, a transaction address, or an address of the smart contract 221, which are used in the decentralized network 210, or a combination thereof.

In one embodiment, the function control policy of the smart contract 221 may be data obtained by matching an API to be subject to the function control policy, an identifier of the API, version information of the API, or a combination thereof, with a value indicating whether to allow the information enumerated above. In one embodiment, the identifier of the API may be data obtained by converting the API using a predesignated function (e.g., a hash function (e.g., keccak)). In one embodiment, the identifier of the API may be data having a predetermined length (e.g., 4 bytes) among data obtained by converting the API using a predesignated function.

In one embodiment, the function control policy of the smart contract 221 may be data obtained by matching parameters (e.g., addresses) that can be inserted into an API to be subject to the function control policy with a value indicating whether to allow the parameters.

In one embodiment, the smart contract 221 may include a program code (hereinafter referred to as an ownership management module) for configuring authority to modify and/or delete the function control policy.

In one embodiment, the service provider 230 may transmit a transaction (hereinafter, referred to as a manager change transaction) requesting the decentralized network 210 to execute the ownership management module of the smart contract 221. In one embodiment, the nodes 211 and 215 of the decentralized network 210 generate a block including a manager change transaction through a consensus algorithm (e.g., PoW and PoS) to record the generated block in the ledger 220. In one embodiment, when a block including the manager change transaction is generated, a predetermined address may be designated as a manager of the smart contract 221 or released from designation as the manager according to the details indicated by the manager change transaction.

In one embodiment, the service provider 230 may transmit a transaction (hereinafter, referred to as a policy change transaction) requesting the decentralized network 210 to modify and/or delete the function control policy of the smart contract 221. In one embodiment, the nodes 211 and 215 of the decentralized network 210 may generate a block including the policy change transaction through the consensus algorithm and record the generated block in the ledger 220. In one embodiment, when the block including the policy change transaction is generated, an API, a parameter (e.g., address) inserted into the API, or a combination thereof may be added to be subject to the function control policy or deleted, according to the details indicated by the policy change transaction. In one embodiment, when a block including a policy change transaction is generated, whether to make an allowance for an API, a parameter (for example, an address) inserted into the API, or a combination thereof may be changed according to the details indicated by the policy change transaction.

In one embodiment, the electronic device 101 may include the processor 120, memory 130, communication module 190, or a combination thereof, corresponding to FIG. 1.

In one embodiment, the processor 120 of the electronic device 101 may load, based on a first input, an application (e.g., the application 146 of FIG. 1) stored in a non-volatile memory (e.g., the non-volatile memory 134) of the memory 130 into a volatile memory (e.g., the volatile memory 132). In one embodiment, the processor 120 may execute the loaded application 146. In one embodiment, the first input may be understood as a request for execution of the application 146. Hereinafter, the life cycle of the application 146, from the time of starting the loading of the application 146 to the time of ending the execution of the application 146, may be understood as the time during which the application 146 is run.

In one embodiment, the processor 120 may request a function control policy from the decentralized network 210 through the communication module 190 while loading the application 146. In one embodiment, the processor 120 may request a function control policy associated with the application 146 while loading the application 146. In one embodiment, the processor 120 may transmit, to the decentralized network 210, a function control policy request including information (e.g., identifier) of the application 146, information of the smart contract 221 (e.g., the address of the smart contract 221) for managing the function control policy associated with the application 146, or a combination thereof.

In one embodiment, the processor 120 may request a list indicating the function control policy from the decentralized network 210 while loading the application 146. In one embodiment, the list indicating the function control policy may be data including all function control policies for APIs executable in the application 146.

In one embodiment, at least one (e.g., the node 211) of the nodes 211 and 215 of the decentralized network 210 may receive a function control policy request, identify the function control policy indicated by the smart contract 221, and transmit the identified function control policy to the electronic device 101. In an embodiment, the node 211 may transmit a list indicating the function control policy to the electronic device 101 in response to the function control policy request.

In one embodiment, the processor 120 may receive the function control policy from the decentralized network 210, and may store the received function control policy in the memory 130. In one embodiment, the processor 120 may maintain the function control policy stored in the memory 130 while the application 146 is running. In one embodiment, the function control policy received from the decentralized network 210 may include a list of at least one API to be controlled, a validity for the at least one API (or whether to allow the API), or a combination thereof. In one embodiment, the list of at least one API may include an API, an identifier of the API, or a combination thereof.

In one embodiment, when a second input is identified through the application 146 while executing the application 146, the processor 120 may identify whether the API indicated by the identified second input is a predesignated API (e.g., send). In one embodiment, the predesignated API may be an API that requires identification of the latest function control policy before the processor 120 executes the API after calling the same. In one embodiment, the predesignated API may be an API, the validity period of which has expired, among APIs included in the function control policy stored in the memory 130. For example, if the function control policy stored in the memory 130 is updated based on the third input, input before the second input, and if the valid period of the updated function control policy has not expired, the processor 120 may not identify the API, indicated by the second input, as a predesignated API. For example, if the function control policy stored in the memory 130 is updated based on the third input before the second input, and the valid period of the updated function control policy expires, the processor 120 may identify the API, indicated by the second input, as a predesignated API. In one embodiment, the calling of the API may indicate that the processor 120 generates data (e.g., send (address)) obtained by inserting designated parameters (e.g., addresses) into the API (e.g., send ( )).

In one embodiment, the processor 120 may perform an operation for identifying the latest function control policy when the API indicated by the identified second input is a predesignated API. In one embodiment, the processor 120 may determine whether the API is executable based on a function control policy stored in the memory 130 when the API indicated by the identified second input is not a predesignated API.

In one embodiment, the processor 120 may request a function control policy from the decentralized network 210 when the API indicated by the identified second input is a predesignated API. In one embodiment, when the API indicated by the identified second input is a predesignated API, the processor 120 may request a function control policy for the API indicated by the identified second input. In one embodiment, when the API indicated by the identified second input is a predesignated API, the processor 120 may request a function control policy for parameters inserted into the API indicated by the identified second input. For example, if the identified second input is touch input performed on a button indicating a predetermined function (e.g., remittance), the processor 120 may request a function control policy for an API (e.g., send ( )) indicated by the identified second input. For example, if the identified second input is touch input performed on a button indicating a predetermined function (e.g., remittance), the processor 120 may request a function control policy for parameters (e.g., addresses) inserted into an API (e.g., send ( )) indicated by the identified second input. In one embodiment, the processor 120 may request, from the decentralized network 210, a function control policy for APIs executable in the application 146 while executing the application 146. In one embodiment, the second input may be understood as a request for execution of a function of the application 146 while the application 146 is running.

In one embodiment, the processor 120 may, based on the second input, identify an API indicated by the second input and parameters inserted into the API, and may transmit a function control policy request including the identified API and parameters to the decentralized network 210.

In one embodiment, at least one node (e.g., the node 211) among the nodes 211 and 215 of the decentralized network 210 may receive a function control policy request, identify a function control policy indicated by the smart contract 221, and transmit the identified function control policy to the electronic device 101. In one embodiment, the node 211 may transmit, in response to the function control policy request, the function control policy for the identified API to the electronic device 101. In one embodiment, the node 211 may transmit, in response to the function control policy request, the function control policy for the identified parameter to the electronic device 101.

In one embodiment, the processor 120 may receive the function control policy from the decentralized network 210, and may update the function control policy, which is stored in the memory 130, based on the received function control policy. In one embodiment, the function control policy received from the decentralized network 210 may include a list of at least one API to be controlled, a validity for the at least one API (or whether to allow the API), or a combination thereof. In one embodiment, the function control policy received from the decentralized network 210 may include a list of at least one parameter inserted into at least one API to be controlled, a validity for the at least one parameter (or whether to allow the parameter), or a combination thereof.

In one embodiment, the processor 120 may control the function of the application 146 based on the function control policy, which is received from the decentralized network 210 using the communication module 190.

In one embodiment, if the function control policy indicates an allowance (e.g., OK) for a predetermined function, the processor 120 may execute the allowed predetermined function. In one embodiment, execution of the predetermined function may indicate transmission of the called function to an external device (e.g., the decentralized network 210 and the service provider 230, or the electronic devices 102 and 104 and the server 108 of FIG. 1 or a combination thereof, which are distinguished therefrom).

In one embodiment, while executing a predetermined function, the processor 120 may stop execution of the predetermined function being executed. In one embodiment, the processor 120 may, while executing a predetermined function, stop execution of the predetermined function when the function control policy for the function being executed is changed. In one embodiment, stopping of execution of the predetermined function being executed may indicate transmission of an execution stop request to an external device (e.g., the decentralized network 210 and the service provider 230, or the electronic devices 102 and 104 and the server 108 of FIG. 1 or a combination thereof, which are distinguished therefrom). In one embodiment, the processor 120 may call an API for stopping execution of the predetermined function being executed, and may transmit the called API to an external device (e.g., the decentralized network 210 and the service provider 230, or the electronic devices 102 and 104 and the server 108 of FIG. 1 or a combination thereof, which are distinguished therefrom).

In one embodiment, when execution of the predetermined function being executed is stopped, the processor 120 may notify a user that execution of the predetermined function is stopped. In one embodiment, the processor 120 may provide a notification to the user by displaying, through a display (e.g., the display device 160 of FIG. 1), a user interface indicating that execution of the predetermined function is stopped.

In one embodiment, if the function control policy indicates disallowance (e.g., NOK) of a predetermined function, the processor 120 may not execute the disallowed predetermined function. In one embodiment, if the function control policy indicates disallowance (e.g., NOK) of the predetermined function, the processor 120 may notify the user that the predetermined function is not executable. In one embodiment, the processor 120 may provide a notification to a user by displaying, through a display (e.g., the display device 160 of FIG. 1), a user interface indicating that a predetermined function is not executable.

Figure 3:
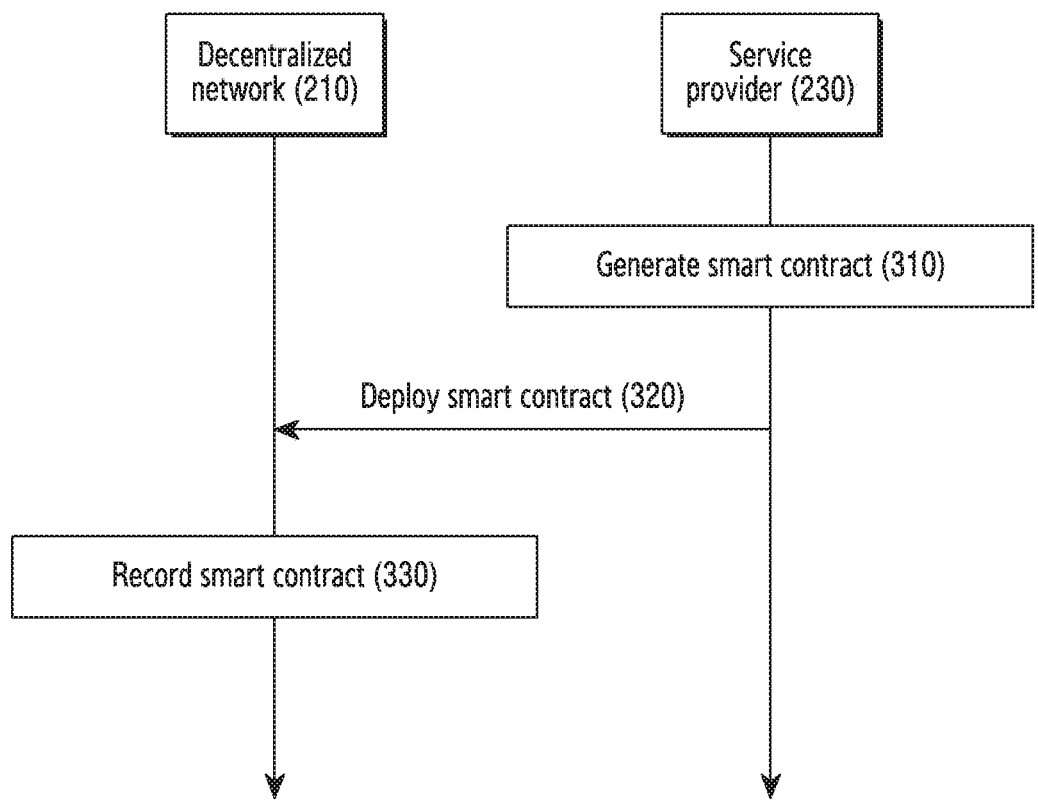
FIG. 3 is a flowchart illustrating an operation of recording a smart contract according to an embodiment of the disclosure.

FIG. 3 is a flowchart illustrating an operation of recording a smart contract according to an embodiment of the disclosure. FIG. 3 may be described with reference to configurations of FIG. 1 or 2.

A decentralized network and service provider of FIG. 3 may correspond to the decentralized network 210 and the service provider 230 of FIG. 2, respectively.

Referring to FIG. 3, in operation 310, the service provider 230 may generate a smart contract (e.g., the smart contract 221 of FIG. 2).

In one embodiment, the service provider 230 may generate a smart contract 221 including a function control policy, an ownership management module, or a combination thereof.

In operation 320, the service provider 230 may deploy the smart contract 221 in the decentralized network 210.

In one embodiment, the service provider 230 may deploy the smart contract 221 by transmitting a transaction indicating the smart contract 221 to the decentralized network 210.

In operation 330, the decentralized network 210 may record the smart contract 221 in a ledger (e.g., the ledger 220 in FIG. 2).

In one embodiment, nodes of the decentralized network 210 (e.g., the nodes 211, and 215 of FIG. 2) may generate a block including the smart contract 221 through a consensus algorithm (e.g., proof-of-work (PoW) and proof-of-stake (PoS)) and record the generated block in the ledger 220. In one embodiment, the generated block including the smart contract 221 may include information indicating a previous block.

In one embodiment, the decentralized network 210 may notify the service provider 230 of the address of the smart contract 221, generated while recording the smart contract 221 in the ledger 220.

In one embodiment, the service provider 230 may identify that the smart contract 221 has been deployed based on the notified address.

In one embodiment, when the smart contract 221 is recorded in the ledger 220, the service provider 230 may manage the function control policy of the smart contract 221 based on the address of the smart contract 221 or may manage the manager of the smart contract 221.

Figure 4:
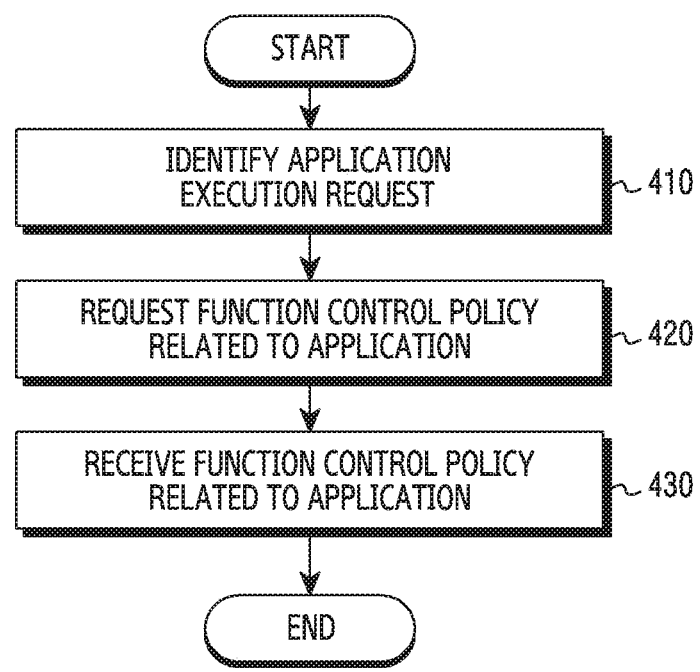
FIG. 4 is a flowchart illustrating an operation of first receiving a function control policy performed by an electronic device according to an embodiment of the disclosure.

FIG. 4 is a flowchart illustrating an operation of first receiving a function control policy performed by an electronic device (e.g., the electronic device 101 of FIG. 2) according to an embodiment of the disclosure. FIG. 4 may be described with reference to configurations of FIG. 1 or FIG. 2.

Referring to FIG. 4, in operation 410, a processor of the electronic device 101 (e.g., the processor 120 of FIG. 2) may identify a request for execution of an application (e.g., the application 146 of FIG. 1).

In one embodiment, the processor 120 may load, based on identification of the request for execution of the application 146, an application 146 stored in a non-volatile memory (e.g., the non-volatile memory 134) of a memory (e.g., the memory 130 of FIG. 2) into a volatile memory (e.g., the volatile memory 132 of FIG. 1).

In operation 420, when the request for execution of the application 146 is identified, the processor 120 may request a function control policy from the decentralized network 210 through a communication module (e.g., the communication module 190 of FIG. 2). In one embodiment, the processor 120 may request a function control policy for APIs executable in the application 146 from the decentralized network 210. In an embodiment, the processor 120 may request, from the decentralized network 210, a function control policy for APIs, which are managed by a smart contract (e.g., the smart contract 221 of FIG. 2), among APIs executable in the application 146.

In operation 430, the processor 120 may receive a function control policy from the decentralized network 210 through the communication module 190. In one embodiment, the processor 120 may receive a function control policy for APIs executable in the application 146 from the decentralized network 210. In one embodiment, the processor 120 may receive, from the decentralized network 210, a function control policy for APIs, which are managed by a smart contract (e.g., the smart contract 221 of FIG. 2), among APIs executable in the application 146.

In one embodiment, the processor 120 may store the received function control policy in a memory (e.g., the memory 130 of FIG. 2). In one embodiment, the processor 120 may maintain, in the memory (e.g., the memory 130 of FIG. 2), the function control policy received while the application 146 is running.

Figure 5:
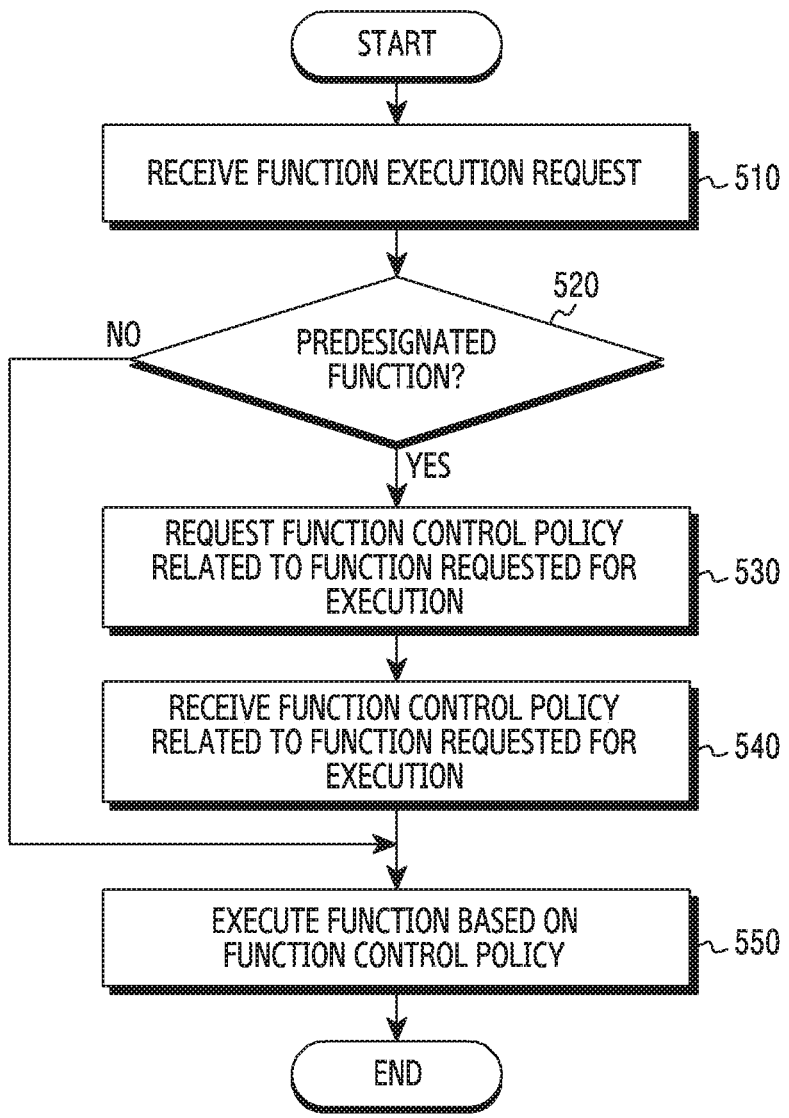
FIG. 5 is a flowchart illustrating an operation according to a function execution request performed by an electronic device according to an embodiment of the disclosure.

FIG. 5 is a flowchart illustrating an operation according to a function execution request performed by an electronic device (e.g., the electronic device 101 of FIG. 2) according to an embodiment of the disclosure. FIG. 5 may be described with reference to the configurations of FIG. 1 or FIG. 2.

In one embodiment, the operations of FIG. 5 may be performed after performing the operations of FIG. 4. In one embodiment, the processor (e.g., the processor 120 of FIG. 2) of the electronic device 101 may be in a state of driving an application (e.g., the application 146 of FIG. 1). In one embodiment, the processor 120 may be in a state of storing a function control policy, which has been received according to operation 430 of FIG. 4, in a memory (e.g., the memory 130 of FIG. 2).

Referring to FIG. 5, in operation 510, the processor 120 may identify a function execution request from the application 146 that is running.

In one embodiment, the processor 120 may call an API indicated by a function requested for execution, based on identification of the function execution request from the running application 146. In one embodiment, the calling of the API may indicate that the processor 120 generates data (e.g., send (address)) obtained by inserting designated parameters (e.g., addresses) into the API (e.g., send ( )).

In operation 520, the processor 120 may identify whether the function requested for execution is a predesignated function. In one embodiment, the predesignated function may be a function that requires confirmation of the latest function control policy before execution thereof. For example, the predesignated function may include a remittance function (send ( )).

In operation 520, when the function requested for execution is a predesignated function (determined as "yes"), the processor 120 may perform operation 530. In operation 520, when the function requested for execution is not a predesignated function (determined as "no"), the processor 120 may perform operation 550.

In operation 530, the processor 120 may request a function control policy from the decentralized network 210 through a communication module (e.g., the communication module 190 of FIG. 2).

In one embodiment, the processor 120 may request, from the decentralized network 210, a function control policy for an API related to a function requested for execution. In one embodiment, the processor 120 may request, from the decentralized network 210, a function control policy for a parameter value inserted into an API related to the function requested for execution.

In operation 540, the processor 120 may receive a function control policy from the decentralized network 210 through the communication module 190.

In one embodiment, the processor 120 may update the function control policy stored in the memory 130 based on the received function control policy.

In operation 550, the processor 120 may execute the function requested for execution, based on the function control policy. In one embodiment, when the function control policy stored in the memory 130 allows execution of the function requested for execution, the processor 120 may execute the function requested for execution. In one embodiment, if the function control policy stored in the memory 130 does not allow execution of the function requested for execution, the processor 120 may not execute the function requested for execution.

Figure 6:
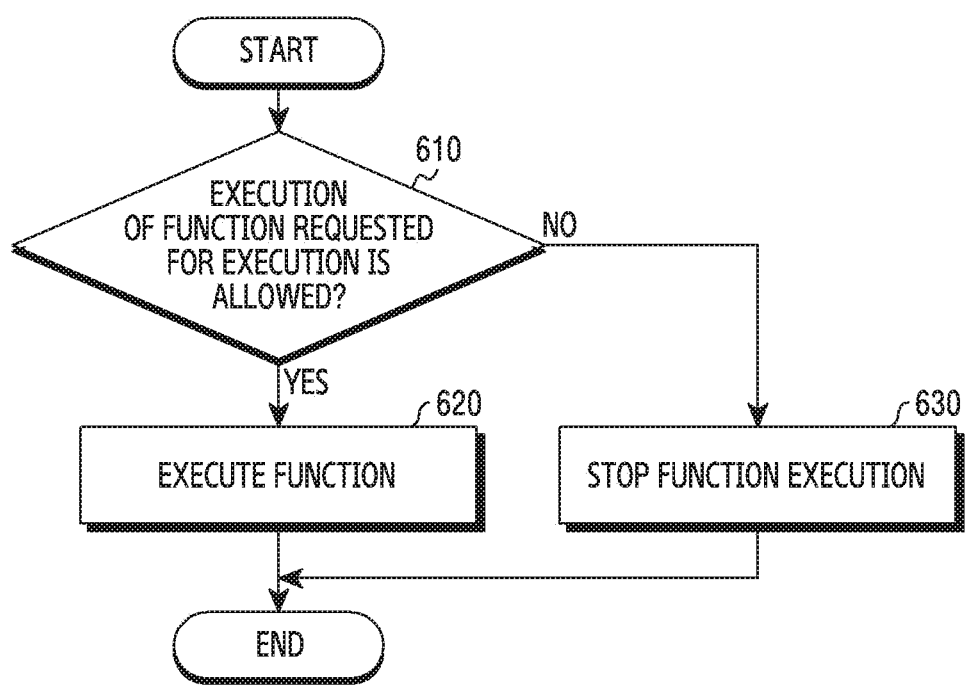
FIG. 6 is a flowchart illustrating an operation according to whether to allow execution of a function performed by an electronic device according to an embodiment of the disclosure.

FIG. 6 is a flowchart illustrating an operation according to whether to allow execution of a function performed by an electronic device (e.g., the electronic device 101 of FIG. 2) according to an embodiment of the disclosure. FIG. 6 may be described with reference to the configurations of FIG. 1 or FIG. 2.

In one embodiment, the operations 610 to 630 of FIG. 6 may be included in operation 550 of FIG. 5.

Referring to FIG. 6, in operation 610, a processor (e.g., the processor 120 of FIG. 2) of the electronic device 101 may identify whether to allow execution of a function requested for execution. In one embodiment, the processor 120 may identify whether to allow execution of the function requested for execution, based on a function control policy.

In operation 610, when the function requested for execution is allowed for execution (determined as "yes"), the processor 120 may perform operation 620. In operation 610, when the function requested for execution is not allowed for execution (determined as "no"), the processor 120 may perform operation 630.

In operation 620, the processor 120 may execute the function requested for execution. In one embodiment, the processor 120 may execute a called API indicated by the function requested for execution. In one embodiment, if the function control policy allows execution of the function requested for execution, the processor 120 may transmit the called API to an external device (e.g., the decentralized network 210 and the service provider 230, or the electronic devices 102 and 104, the server 108 in FIG. 1, or a combination thereof, which are distinguished therefrom), and thus may execute the API.

In operation 630, the processor 120 may not execute the function requested for execution. In one embodiment, the processor 120 may not execute the called API indicated by the function requested for execution. In one embodiment, if the function control policy does not allow execution of the function requested for execution, the processor 120 may notify the user that the function requested for execution is not executable. In one embodiment, the processor 120 may provide notification to a user by displaying, through a display (e.g., the display device 160 of FIG. 1), a user interface indicating that the function requested for execution is not executable.

Figure 7:
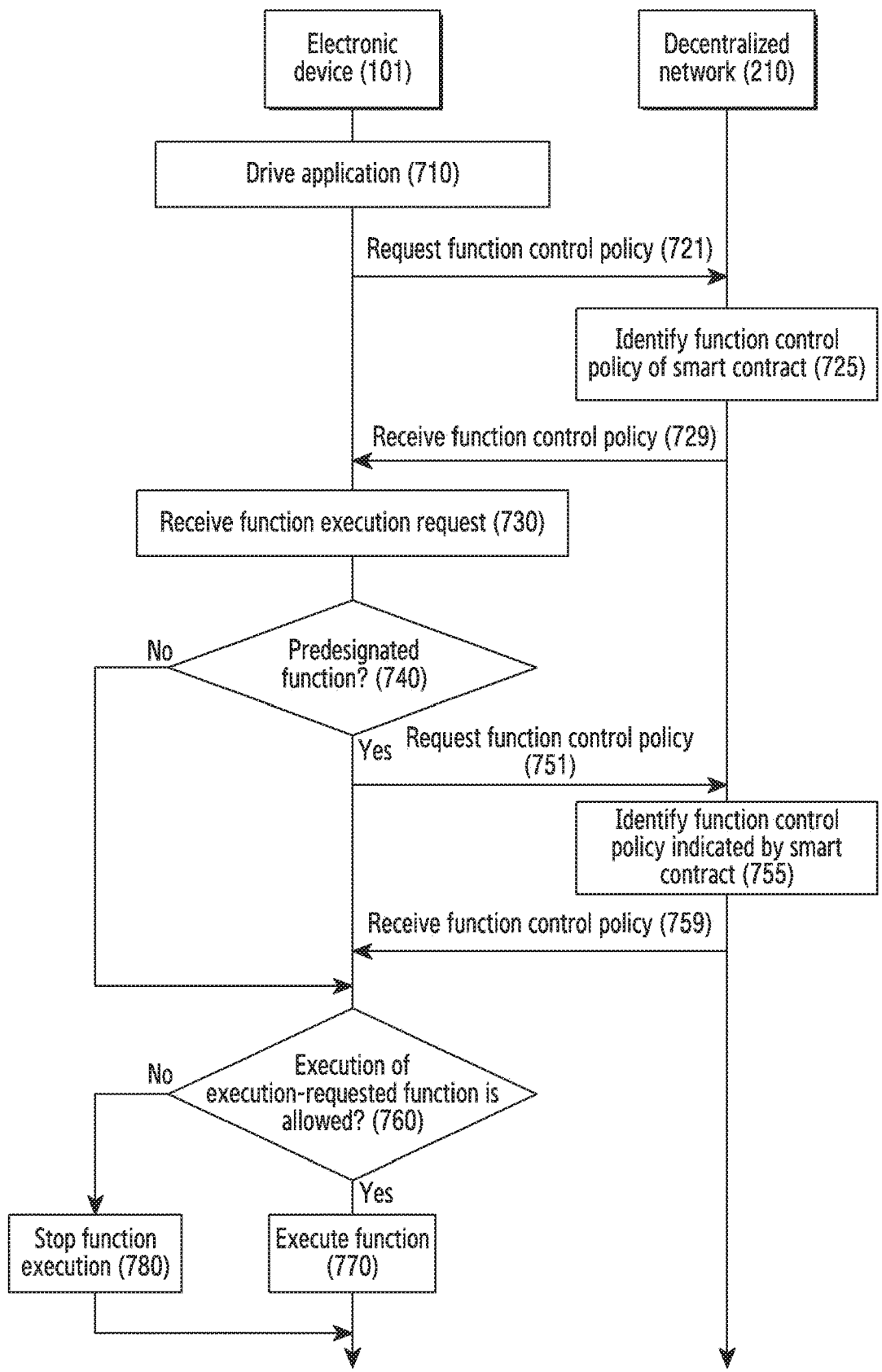
FIG. 7 is a flowchart illustrating an operation of controlling a function performed by an electronic device according to an embodiment of the disclosure.

FIG. 7 is a flowchart illustrating an operation of controlling a function performed by an electronic device (e.g., the electronic device 101 of FIG. 2) according to an embodiment of the disclosure.

FIGS. 8A to 8D illustrate changing user interfaces displayed by an electronic device according to various embodiments of the disclosure. FIG. 7 and FIGS. 8A to 8D may be described with reference to the configurations of FIG. 1 or FIG. 2.

Referring to FIG. 7, in operation 710, the electronic device 101 may drive an application (e.g., the application 146 of FIG. 1). In one embodiment, the driving of the application 146 may be understood as a period from the time when the application 146 starts to load to the time when the execution of the application 146 ends.

In operation 721, the electronic device 101 may request a function control policy from the decentralized network 210. In one embodiment, the electronic device 101 may request a function control policy of a smart contract (e.g., the smart contract 221 of FIG. 2). In one embodiment, the electronic device 101 may transmit a function control policy request including the address of the smart contract 221 to the decentralized network 210.

In operation 725, a node (e.g., the node 211 of FIG. 2), which has received the function control policy request, among nodes (e.g., the nodes 211 and 215 of FIG. 2) of the decentralized network 210, may identify a function control policy for an execution-requested function indicated by the smart contract 221. In one embodiment, the node 211 having received the function control policy request may identify the function control policy of the smart contract 221 indicated by the address included in the function control policy request.

In one embodiment, the node 211 may transmit the identified function control policy to the electronic device 101 based on the function control policy request.

In operation 729, the electronic device 101 may receive a function control policy from the node 211.

In one embodiment, the electronic device 101 may store the received function control policy in a memory (e.g., the memory 130 of FIG. 2).

In operation 730, the electronic device 101 may receive a function execution request.

Figure 8A:
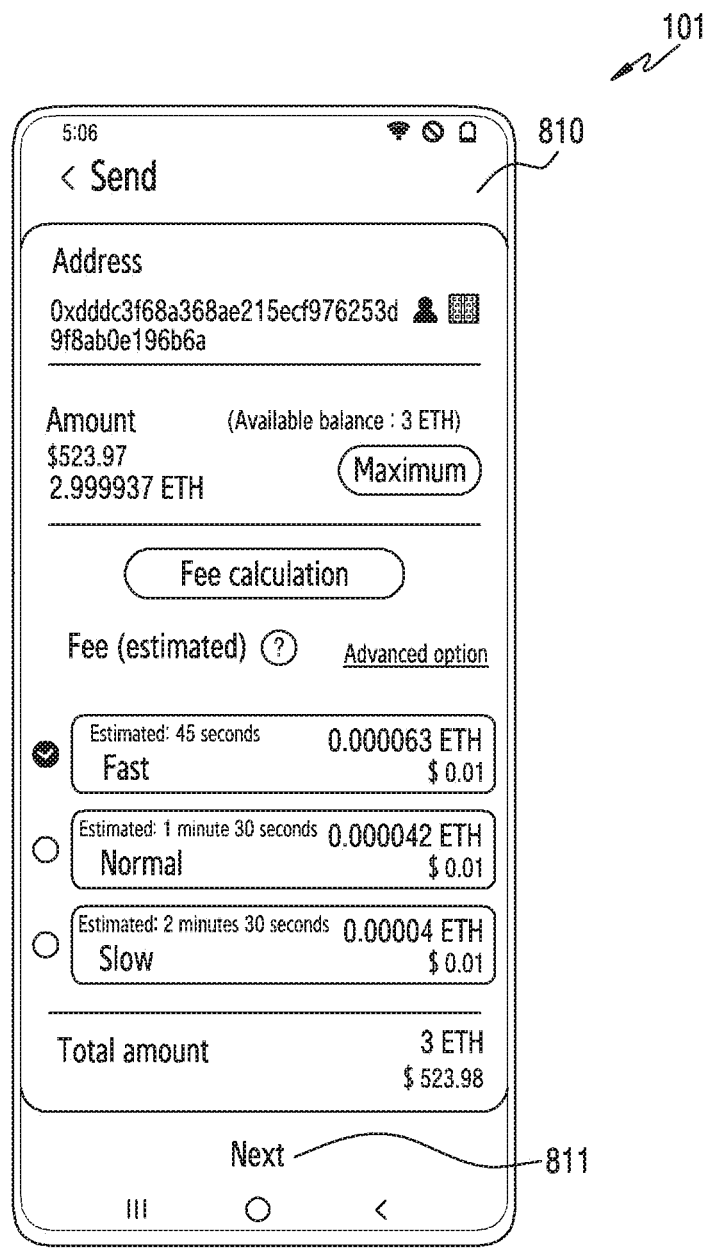
FIGS. 8A, 8B, 8C, and 8D illustrate changing user interfaces according to whether to allow execution of a function performed by an electronic device according to various embodiments of the disclosure.

Referring to FIG. 8A, while the electronic device 101 displays, on the display (e.g., the display device 160 of FIG. 1), a user interface 810 providing an execution screen of the application 146, touch input performed on a visual object 811 by a user may be identified. In one embodiment, the user interface 810 may be a user interface for remitting a designated amount to a user at a designated address by paying a fee for the designated amount. In one embodiment, the fee of the designated amount may be a fee corresponding to a transfer rate selected by the user, among the preconfigured fees. In one embodiment, the transfer rate may be the rate at which a transaction indicating remittance is recorded in a block of the ledger 220 of the decentralized network 210. In one embodiment, the designated address may be the address at which the designated amount is received. In one embodiment, the designated address and/or the designated amount may be input based on user input.

In one embodiment, the electronic device 101 may identify touch input performed on the visual object 811 as a request for execution of a function (e.g., remittance) indicated by the visual object 811.

In operation 740, the electronic device 101 may identify whether a function requested for execution is a predesignated function. In one embodiment, the predesignated function may be a function that requires confirmation of the latest function control policy before execution. For example, the predesignated function may include a remittance function (send ( )).

In one embodiment, when the touch input performed on the visual object 811 is identified, the electronic device 101 may identify whether a function (e.g., remittance) represented by the visual object 811 is a predesignated function.

In operation 751, the electronic device 101 may request, from the decentralized network 210, a function control policy for a function requested for execution. In one embodiment, the electronic device 101 may transmit a function control policy request including the address of the smart contract 221 and the identifier of the function requested for execution to the decentralized network 210.

In operation 755, a node (e.g., node 211 in FIG. 2), which has received a function control policy request, among the nodes 211 and 215 of the decentralized network 210 may identify the function control policy for the function requested for execution, indicated by the smart contract 221.

In one embodiment, the node 211 may transmit the identified function control policy to the electronic device 101 based on the function control policy request.

In operation 759, the electronic device 101 may receive, from the node 211, the function control policy for the function requested for execution.

In one embodiment, the electronic device 101 may update the function control policy stored in the memory 130, based on the newly received function control policy.

In operation 760, the electronic device 101 may identify whether to allow execution of the function requested for execution based on a function control policy stored in the memory 130.

In operation 770, the electronic device 101 may execute the function requested for execution.

Figure 8B:
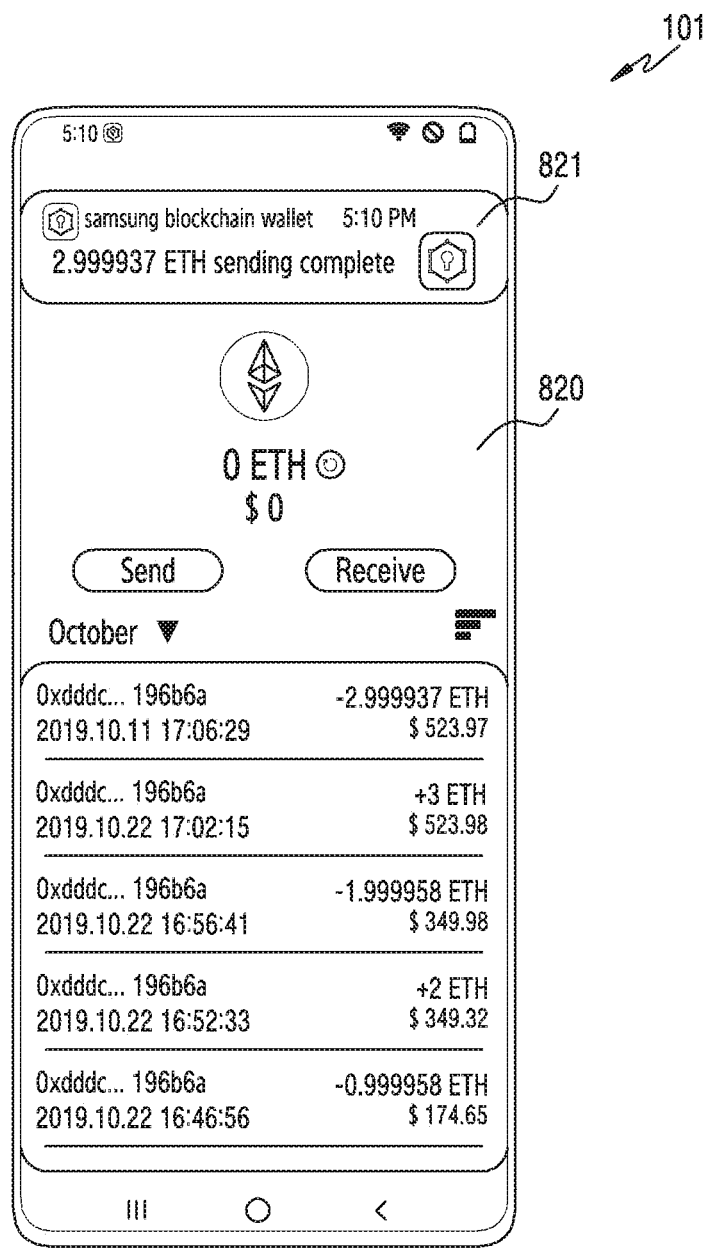

Referring to FIG. 8B, the electronic device 101 may display a user interface 821 indicating that the function requested for execution has been executed. Referring to FIG. 8B, the user interface 821 may be displayed, on the display device 160 in a manner of overlapping a user interface 820, which is generated by the currently running application and is being displayed. In one embodiment, the user interface 820 may be an interface generated by the same application as the user interface 821. However, this is only an example, and the application for generating the user interface 820 may be different from the application for generating the user interface 821.

Figure 8C:
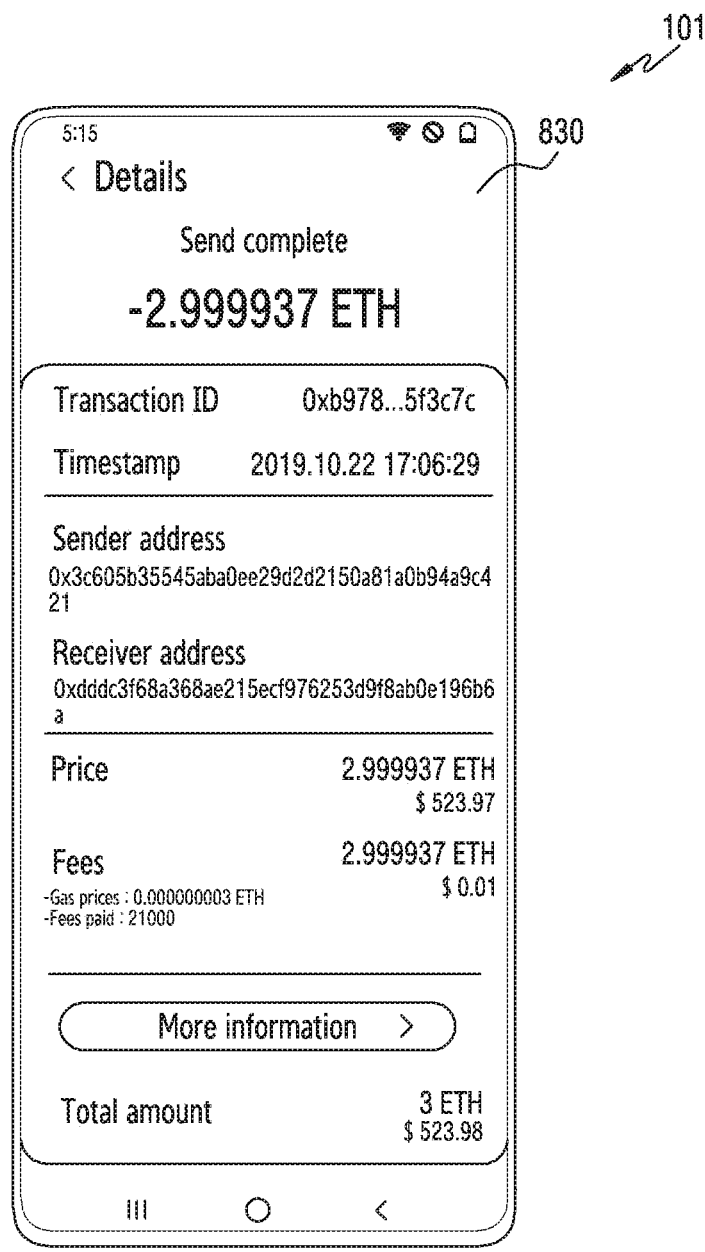

Referring to FIG. 8C, the electronic device 101 may display a user interface 830 indicating a result according to an execution request. In one embodiment, the user interface 830 may be displayed based on user input performed on the user interface 821. In one embodiment, the user interface 830 may indicate time information (e.g., a timestamp) in which a transaction is recorded in the block, an address of the transaction (e.g., transaction identification (ID)), a sender address, a recipient address, an amount, a fee, a total amount, or a combination thereof.

In operation 780, the electronic device 101 may not execute the function requested for execution.

Figure 8D:
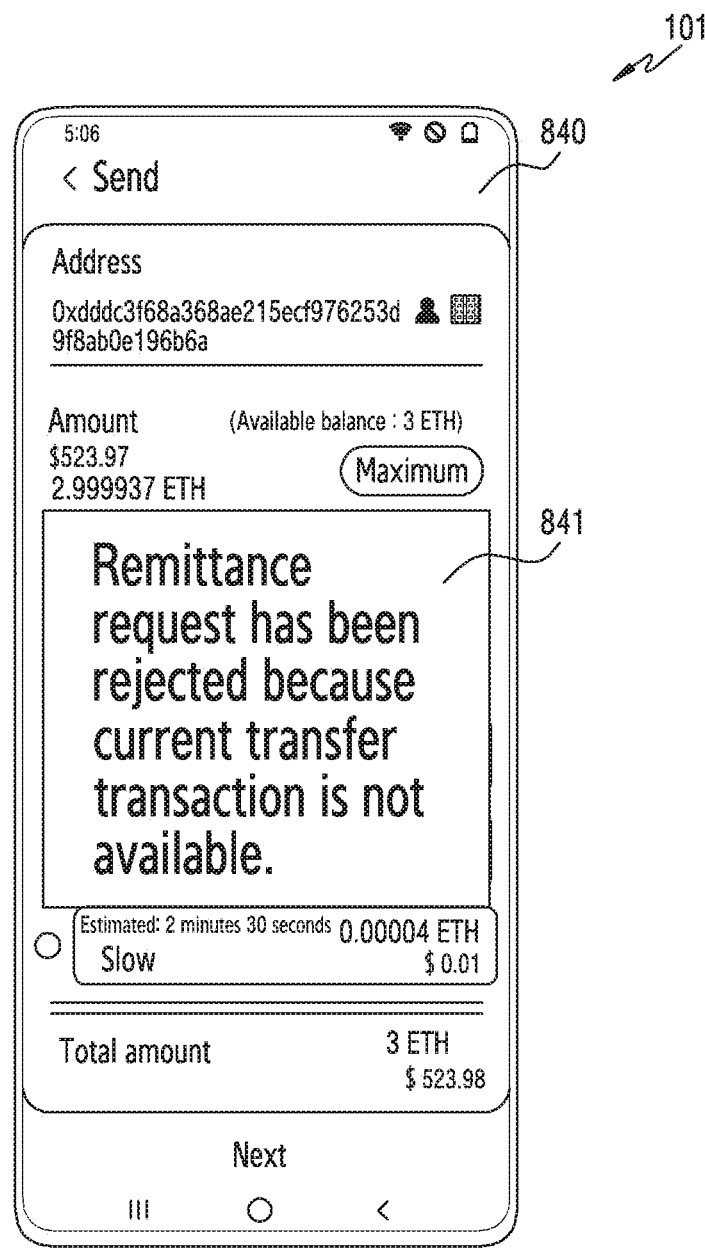

Referring to FIG. 8D, the electronic device 101 may display a user interface 841 indicating that the function requested for execution is not executed. Referring to FIG. 8D, the user interface 841 may be displayed in a pop-up form in front of another user interface 840. In one embodiment, the other user interface 840 may correspond to the user interface 810.

The electronic device 101 and an operation method thereof according to the embodiment described above may control various functions performed in the electronic device in real time using a decentralized network having a distributed ledger in which a function control policy is recorded, and thus may not need server construction.

The electronic device 101 according to an embodiment as described above may include the communication module 190, memory 130 for storing instructions, and processor 120 operably connected to the communication module 190 and the memory 130, wherein the processor 120 is, by executing the instructions, configured to receive a request for execution of an application programming interface (API) from the application 146 while driving the application 146, identify a policy for the execution-requested API based on data received from a decentralized network through the communication module, and determine whether to execute the execution-requested API, based on the identified policy for the API.

In one embodiment, the processor 120 may be, by executing the instructions, further configured to, when a request for execution of the application 146 is received, request the data indicating the policy for the API from the decentralized network 210, and receive the data indicating the policy for the API from the decentralized network 210.

In one embodiment, the processor 120 may be, by executing the instructions, further configured to, when the request for execution of the API is received from the application 146, request the data indicating the policy for the API from the decentralized network 210, and receive the data indicating the policy for the API from the decentralized network 210.

In one embodiment, the processor 120 may be, by executing the instructions, further configured to, when a request for execution of the API is received from the application 146, identify whether the API is a predesignated API, and in response to the identifying of the API as the predesignated API, request the data indicating the policy for the API from the decentralized network 210.

In one embodiment, the processor 120 may be, by executing the instructions, further configured to, in case that the API is not identified as the predesignated API, identify, based on data received from the decentralized network 210 before the request for execution of the API, a policy for the execution-requested API.

In one embodiment, the data received before the request for execution of the API may include data received from the decentralized network 210 based on the request for execution of the application 146, data received from the decentralized network 210 based on a previous request for execution of the API, received before the request for execution of the API, or a combination thereof In one embodiment, the electronic device may further include a display (e.g., the display device 160), wherein the processor 120 may be, by executing the instructions, further configured to, based on the identified policy for the API, identify whether execution of the execution-requested API is allowed, when it is identified that execution of the execution-requested API is allowed, execute the execution-requested API, and when it is identified that execution of the execution-requested API is not allowed, output, through the display (e.g., the display device 160), a notification indicating that the execution-requested API is not executed.

In one embodiment, the data received from the decentralized network 210 is based on the result of execution of a smart contract 221 recorded in the decentralized network 210.

In one embodiment, the processor 120 may be, by executing the instructions, further configured to, based on the data received from the decentralized network 210, identify a policy for an address included in the execution-requested API, and determine whether to execute the execution-requested API, based on the identified policy for the address included in the API.

In one embodiment, the data received from the decentralized network 210 may include a list of at least one API to be controlled, a validity for the API, or a combination thereof.

An operation method of the electronic device 101 according to an embodiment as described above may include receiving a request for execution of an application programming interface (API) from an application 146 while driving the application 146, identifying a policy for the execution-requested API based on data received from a decentralized network 210 through the communication module 190 of the electronic device 101, and determining whether to execute the execution-requested API based on the identified policy for the API.

In one embodiment, the operation method of the electronic device 101 may further include receiving a request for execution of the application 146, when the request for execution of the application 146 is received, requesting the data indicating the policy for the API from the decentralized network 210, and receiving the data indicating the policy for the API from the decentralized network 210.

In one embodiment, the operation method of the electronic device 101 according to an embodiment may further include, when the request for execution of the API is received from the application 146, requesting the data indicating the policy for the API from the decentralized network 210, and receiving the data indicating the policy for the API from the decentralized network 210.

In the operation method of the electronic device 101 according to an embodiment, the requesting of the data may further include, when a request for execution of the API is received from the application 146, identifying whether the API is a predesignated API, and, in response to the identifying of the API as the predesignated API, requesting the data indicating the policy for the API from the decentralized network 210.

In the operation method of the electronic device 101 according to an embodiment, the identifying of the policy for the execution-requested API may further include in case that the API is not identified as the predesignated API, identifying, based on data received from the decentralized network 210 before the request for execution of the API, a policy for the execution-requested API.

In one embodiment, the data received before the request for execution of the API may include data received from the decentralized network 210 based on the request for execution of the application 146, data received from the decentralized network 210 based on a previous request for execution of the API, received before the request for execution of the API, or a combination thereof.

In one embodiment, the operation method of the electronic device 101 may further include, based on the identified policy for the API, identifying whether execution of the execution-requested API is allowed, when it is identified that the execution of the execution-requested API is allowed, executing the execution-requested API, and when it is identified that the execution of the execution-requested API has not been allowed, outputting, through a display (e.g. the display 160) of the electronic device 101, a notification indicating that the execution-requested API is not executed.

In one embodiment, the data received from the decentralized network 210 is based on the result of execution of a smart contract 221 recorded in the decentralized network 210.

In one embodiment, the operation method of the electronic device 101 may further include, based on the data received from the decentralized network 210, identifying a policy for an address included in the execution-requested API, and determining whether to execute the execution-requested API, based on the identified policy for the address included in the API.

In the operation method of the electronic device 101 according to an embodiment, the data received from the decentralized network 210 may include a list of at least one API to be controlled, a validity for the API, or a combination thereof.

The methods according to the embodiments described in the claims or the specification of the disclosure may be implemented in the form of hardware, software, or a combination of hardware and software.

When implemented in software, a computer-readable storage medium storing one or more programs (software modules) may be provided. One or more programs stored in the computer-readable storage medium are configured for execution by one or more processors in the electronic device. The one or more programs include instructions that cause the electronic device to execute methods according to embodiments described in the claims or specification of the disclosure.

These programs (software modules, software) include random access memory, non-volatile memory including flash memory, read only memory (ROM), and electrically erasable programmable ROM (EEPROM), electrically erasable programmable read only memory), magnetic disc storage device, CD-ROM, digital versatile discs (DVDs), or other forms of optical storage. These programs may also be stored in a magnetic cassette. Alternatively, it may be stored in a memory composed of a combination of some or all such memories. In addition, a plurality of configuration memories may be included.

In addition, the program can be provided via a communication network such as the Internet, intranet, LAN, wide LAN (WLAN), or SAN (storage area network), or a communication network consisting of a combination thereof. It may be stored in an attachable storage device that can be accessed. Such a storage device may be connected to a device performing an embodiment of the disclosure through an external port. In addition, a separate storage device on the communication network may access a device performing an embodiment of the disclosure.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. An electronic device comprising:
a communication module;
a display;
a memory for storing instructions; and
at least one hardware processor operably connected to the communication module, the display and the memory,
wherein the at least one hardware processor is, by executing the instructions, configured to:
identify a request for execution of an application,
based on the identification of the request for execution of the application, request a policy to decentralized network through the communication module, wherein the policy is to be maintained during a life-cycle of the application,
receive the policy from the decentralized network through the communication module,
identify a user input performed on a visual object displayed on the display based on the application, as a request for execution of an application programming interface (API) to provide a function of the application,
identify whether the function corresponds to a predesignated function,
based on identification that the function does not correspond to the predesignated function, determine whether to execute the API, based on the received policy,
based on identification that the function corresponds to the predesignated function:
request data for the policy to the decentralized network through the communication module,
receive the data for the policy from the decentralized network through the communication module,
update the policy based on the received data for the policy, and
determine whether to execute the API, based on the updated policy,
wherein the policy indicates whether to make allowance for a value of a designated parameter to be inserted into the API related to the application,
wherein the policy comprise data obtained by matching parameters that can be inserted into the API to be subject to the policy with a value indicating whether to allow the parameters, and
wherein the parameters comprises a user's address used in the decentralized network, a transaction address used in the decentralized network, an address of a smart contract in the decentralized network, or a combination thereof.

2. The electronic device of claim 1, wherein the policy received before the request for execution of the API comprises:
data received from the decentralized network based on the request for execution of the application;
data received from the decentralized network based on a previous request for execution of the API, received before the request for execution of the API; or
a combination thereof.

3. The electronic device of claim 1, further comprising:
wherein the at least one hardware processor is, by executing the instructions, further configured to:
based on the policy for the API, identify whether execution of the execution-requested API is allowed,
in case that it is identified that execution of the execution-requested API is allowed, execute the execution-requested API, and
in case that it is identified that execution of the execution-requested API is not allowed, output a notification indicating that the execution-requested API is not executed, through the display.

4. The electronic device of claim 1, wherein the data received from the decentralized network is based on a result of execution of the smart contract recorded in the decentralized network.

5. The electronic device of claim 1, wherein the at least one hardware processor is, by executing the instructions, further configured to:
based on the data received from the decentralized network, identify a policy for an address included in the execution-requested API, and
determine whether to execute the execution-requested API, based on the identified policy for the address included in the API.

6. The electronic device of claim 1, wherein the data received from the decentralized network comprises a list of at least one API to be controlled, a validity for the API, or a combination thereof.

7. A method for operating an electronic device, the method comprising:
identifying a request for execution of an application;
based on the identification of the request for execution of the application, requesting a policy to decentralized network through a communication module of the electronic device, wherein the policy is to be maintained during a life-cycle of the application;
receiving the policy from the decentralized network;
identifying a user input performed on a visual object displayed on a display based on the application, as a request for execution of an application programming interface (API) to provide a function of the application;
identifying whether the function corresponds to a predesignated function;
based on identification that the function does not correspond to the predesignated function, determining whether to execute the API, based on the received policy; and
based on identification that the function corresponds to the predesignated function:
requesting data for the policy to the decentralized network,
receiving the data for the policy from the decentralized network,
updating the policy based on the received data for the policy, and
determining whether to execute the API, based on the updated policy,
wherein the policy indicates whether to make allowance for a value of a designated parameter to be inserted into the API related to the application, wherein the policy comprise data obtained by matching parameters that can be inserted into the API to be subject to the policy with a value indicating whether to allow the parameters, and wherein the parameters comprises a user's address used in the decentralized network, a transaction address used in the decentralized network, an address of a smart contract in the decentralized network, or a combination thereof.

8. The method of claim 7, wherein the policy received before the request for execution of the API comprises:

data received from the decentralized network based on the request for execution of the application;

data received from the decentralized network based on a previous request for execution of the API, received before the request for execution of the API; or a combination thereof.

9. The method of claim 7, further comprising:

based on the policy for the API, identifying whether execution of the execution-requested API is allowed;

in case that it is identified that execution of the execution-requested API is allowed, executing the execution-requested API; and in case that it is identified that execution of the execution-requested API is not allowed, outputting a notification indicating that the execution-requested API is not executed, through the display of the electronic device.

10. The method of claim 7, wherein the data received from the decentralized network is based on a result of execution of the smart contract recorded in the decentralized network.

11. The method of claim 7, further comprising:

based on the data received from the decentralized network, identifying a policy for an address included in the execution-requested API; and determining whether to execute the execution-requested API, based on the identified policy for the address included in the API.

12. The method of claim 7, wherein the data received from the decentralized network includes a list of at least one API to be controlled, a validity for the API, or a combination thereof.

* * * * *